(12) United States Patent
Huang et al.

(10) Patent No.: US 10,118,866 B2
(45) Date of Patent: Nov. 6, 2018

(54) FOLIAR FERTILIZER

(75) Inventors: Longbin Huang, Brisbane (AU); Anh Van Nguyen, Brookfield (AU); Victor Rudolph, Brisbane (AU); Gordon Xu, St. Lucia (AU)

(73) Assignee: THE UNIVERSITY OF QUEENSLAND, Queensland (AU)

(*) Notice: Subject to any disclaimer, the term of this patent is extended or adjusted under 35 U.S.C. 154(b) by 914 days.

(21) Appl. No.: 14/383,093

(22) PCT Filed: Mar. 5, 2012

(86) PCT No.: PCT/AU2012/000227
§ 371 (c)(1),
(2), (4) Date: May 14, 2015

(87) PCT Pub. No.: WO2012/116417
PCT Pub. Date: Sep. 7, 2012

(65) Prior Publication Data
US 2015/0266786 A1    Sep. 24, 2015

(30) Foreign Application Priority Data

Mar. 3, 2011 (AU) .................. 2011900756

(51) Int. Cl.
| | | |
|---|---|---|
| C05D 9/02 | (2006.01) | |
| C05C 5/00 | (2006.01) | |
| C05G 3/00 | (2006.01) | |
| C01B 21/092 | (2006.01) | |

(52) U.S. Cl.
CPC .............. *C05C 5/00* (2013.01); *C01B 21/092* (2013.01); *C05D 9/02* (2013.01); *C05G 3/0064* (2013.01);
(Continued)

(58) Field of Classification Search
CPC ...... C01B 21/092; C05D 9/02; C05G 3/0064; C05G 3/0076
See application file for complete search history.

(56) References Cited

U.S. PATENT DOCUMENTS

| | | | |
|---|---|---|---|
| 2005/0119154 A1* | 6/2005 | Song .................... | C11D 3/0073 510/508 |
| 2006/0014645 A1 | 1/2006 | Yavitz | |
| 2007/0009809 A1 | 1/2007 | Krekeler | |
| 2010/0160161 A1 | 6/2010 | Choi | |
| 2011/0229421 A1* | 9/2011 | Rusin ....................... | A61K 8/11 424/52 |

FOREIGN PATENT DOCUMENTS

| | | |
|---|---|---|
| DE | 102007020242 A1 | 10/2008 |
| GB | 2396556 A | 6/2004 |

(Continued)

OTHER PUBLICATIONS

Rizwan Wahab, Young-Soon Kim and Hyung-Shik Shin. "Synthesis, Characterization and Effect of pH Variation on Zinc Oxide Nanostructures" Materials Transactions, vol. 50, No. 8 (2009) pp. 2092 to 2097.*

(Continued)

*Primary Examiner* — Jennifer A Smith
(74) *Attorney, Agent, or Firm* — TraskBritt

(57) ABSTRACT

Nanocrystalline compounds containing essential nutrients have been synthesized to have effective physical and chemical characteristics, including a high contact surface area/total surface area ratio that provides maximal leaf surface contact, limited mobility and improved solubility, a net positive charge, soluble salt-forming groups, and reactive surface edges for cation exchange to release nutrient cationic ions into the water film on leaf surfaces.

22 Claims, 4 Drawing Sheets

(52) U.S. Cl.
CPC ....... *C05G 3/0076* (2013.01); *Y10T 428/2982* (2015.01)

(56) References Cited

FOREIGN PATENT DOCUMENTS

| WO | 2003059070 A1 | 7/2003 |
|---|---|---|
| WO | 2009127256 A1 | 10/2009 |
| WO | 2013118131 A1 | 8/2013 |
| WO | 2013121244 A1 | 8/2013 |

OTHER PUBLICATIONS

Bisht, Savita, et al. "pDNA loaded calcium phosphate nanoparticles: highly efficient non-viral vector for gene delivery." International journal of pharmaceutics 288.1 (2005): 157-168.*

Yu et al. "Effects of physicocohemical properties of zinc oxide nanoparticles on cellular uptake." Journal of Physical: Conference Series 304. 012007 (2011): 1-6.*
International Search Report for International application No. PCT/AU2012/000227 dated May 3, 2012, 3 pages.
Written Opinion for International application No. PCT/AU2012/000227 filed May 3, 2012, 5 pages.
Chinese First Office Action for Chinese Application No. 201280072379.6 dated Oct. 19, 2015, 13 pages with translation.
Chinese Second Office Action for Chinese Application No. 201280072379.6 dated Sep. 8, 2016, 13 pages with translation.
Chinese Third Office Action for Chinese Application No. 201280072379.6 dated Mar. 20, 2017, 7 pages with translation.
Chinese Fourth Office Action for Chinese Application No. 201280072379.6 dated Sep. 13, 2017, 13 pages with translation.
European Office Action for European Application No. 12752681.2, dated May 9, 2017, four pages.
European Extend Search Report for European Application No. 12752681, dated Jan. 29, 2016, 8 pages.

* cited by examiner

FOLIAR FERTILIZER

CROSS-REFERENCE TO RELATED APPLICATIONS

This application is a national phase entry under 35 U.S.C. § 371 of International Patent Application PCT/AU2012/000227, filed Mar. 5, 2012, designating the United States of America and published in English as International Patent Publication WO 2012/116417 A1 on Sep. 7, 2012, the disclosure of which is hereby incorporated herein in its entirety by this reference.

TECHNICAL FIELD

The present invention relates to a foliar fertilizer. Particularly, the present invention relates to a foliar fertilizer having improved morphology and physicochemical characteristics.

BACKGROUND

Plants require a ranger of nutrients, both macro- and micro-, to ensure healthy growth. In certain environments, abiotic constraints preclude the availability of sufficient amounts of these essential nutrients for root uptake via addition of fertilizer to the soil. This can be due to inadequate levels of soluble forms of mineral nutrients in soil solution, water deficit in the top soil, an alkaline soil pH, high soil carbonate content, low organic matter content in soil and other key soil factors that limit nutrient availability.

Grain and seed crops, as well as fruit trees, require rapid and intensive nutrient supply of large amounts of mineral nutrients into flowers, young seeds, pods and fruits, particularly during the reproductive growth stage, which may coincide with declined root vigor and unfavorable soil (e.g., water deficit) and climate conditions (e.g., high temperature), leading to untimely and inadequate nutrient supply to meet this rapid demand. In addition, continual removal of micronutrients in seeds, grains and fruits can deplete the available pool of nutrients in soils. Under these circumstances, the application of foliar fertilizers provides a precise, timely and effective supply of nutrients for plant reproductive organs and at much lower required application rates than soil fertilizers. This can result in not only quick correction or prevention of nutrient disorders and yield losses but also an improvement in crop quality.

Under such conditions, it has been found that foliar fertilization provides great benefits in terms of producing improved yields of healthy plants and crops. Foliar fertilization is the application of liquid fertilizer directly onto aboveground plant parts, rather than to the soil surrounding the plant. The fertilizer is drawn into the plant by penetration through either or both of the stomatal openings and cuticle into the leaf epidermis.

A typical foliar fertilizer may be either a solution of a soluble chemical compound in water or a dispersion/suspension of a non-soluble fertilizing compound in water.

The use of a soluble fertilizing compound facilitates rapid penetration of nutrient ions into the plant and, therefore, provides for efficient correction of nutritional deficiencies. However, the use of a highly soluble fertilizing compound can lead to phytotoxicity and so it can only be applied in very low concentrations through repetitive sprays (for example, two to four sprays from late vegetative growth to reproduction stage). This necessitates the labor-intensive use of a low-dosage fertilizer composition over multiple applications to supply the required amount of nutrients for healthy growth.

Suspension foliar fertilizers are, generally, inorganic mineral compounds, such as oxides and hydroxides, which are finely ground and have relatively low water solubility. Due to their low solubility, they can be applied to plants at higher concentrations without any risk of phytotoxicity. The presence of the low-solubility fertilizing compound on the leaf surface acts as a slow release source, meaning the plant can be supplied with appropriate nutrients over a relatively long period of time after a one-time application process.

In practice, it has been found that the advantages of suspension foliar fertilizers are tempered by issues of poor distribution on the leaf surface as well as availability of the low-solubility fertilizing compound sometimes being inadequate. Further, since the fertilizing compound, after application, is left behind as a fine solid on the leaf surface, it may be prone to being washed or blown off that surface by the elements.

There is a need for an improved foliar fertilizing composition to facilitate efficient and reliable supply of desired nutrients to a plant.

OBJECT OF THE INVENTION

The object of the invention is to overcome, or at least alleviate, one or more of the above problems or to at least provide for a useful commercial choice.

SUMMARY OF THE INVENTION

In one broad form, the invention resides in a nanoparticulate foliar fertilizing compound wherein the nanoparticles have a contact surface area to total surface area ratio greater than 1:4.

Preferably, the contact surface area to total surface area ratio is greater than 1:3, more preferably approaching 1:2.

Suitably, the nanoparticles have a planar or sheet-like morphology.

Preferably, the fertilizing compound comprises one or more nitrate groups.

Suitably, the fertilizing compound has an overall positive surface charge or potential in water.

In a first aspect, although it need not be the only or, indeed, the broadest form, the invention resides in a foliar fertilizer composition comprising a fertilizing compound having an overall positive surface charge or potential at neutral pH.

The surface charge or potential may be measured by microelectrophoresis.

Preferably, the foliar fertilizer composition further comprises a liquid carrier.

The liquid carrier may be an aqueous liquid carrier.

Preferably, the liquid carrier is water, is substantially water or consists of water.

Alternatively, the liquid carrier may be water-based but containing one or more suitable surfactants or stability additives.

Suitably, the fertilizing compound is present in the form of particles having at least one dimension less than about 1000 nm, preferably less than about 500 nm, more preferably less than about 250 nm, even more preferably less than about 150 nm, most preferably less than about 100 nm.

Preferably, the fertilizing compound is present in the form of nanoparticles, more preferably, in the form of nanocrystals.

Suitably, the nanocrystals of the fertilizing compound will have a high contact surface area to total surface area ratio.

The ratio of the contact area of a nanoparticle on the leaf surface to the volume of the nanoparticles may be defined as being at least 1, preferably more than 10, more preferably more than 20, more preferably more than 50, most preferably more than 100.

Preferably, the fertilizing compound nanocrystals have a sheet-like or platelet shape.

Suitably, the fertilizing compound is dispersed in the liquid carrier.

Preferably, the solubility of the fertilizing compound in water is between 0.1-100 mg/L for micronutrient elements and 100-1000 mg/L for macronutrient elements. For zinc and manganese, a suitable range is 5-50 mg/L; for copper 1-5 mg/L, for molybdenum 0.1-1 mg/L and for calcium and magnesium 100-500 mg/L.

The fertilizing compound may contain a plant nutrient element selected from the group consisting of zinc, copper, iron, manganese, boron, molybdenum, chlorine, phosphorus, potassium, calcium, magnesium and sulphur.

Preferably, the fertilizing compound has one or more groups that form a water-soluble salt with a cationic fertilizing element including nitrate, chloride, sulphate, phosphate and acetate, but not limited thereto.

The fertilizing compound may be a zinc-containing compound having at least one nitrate group.

Preferably, the fertilizing compound is a zinc hydroxide nitrate compound.

Suitably, the fertilizing compound has the formula $Zn_5(OH)_8(NO3)_2 \cdot 2H_2O$.

In a second aspect, the invention resides in a foliar fertilizer composition comprising a nanoparticulate fertilizing compound having a sheet-like morphology.

Preferably, the nanoparticulate fertilizing compound is a nanocrystalline fertilizer.

The foliar fertilizer composition of the second aspect employs the fertilizing compound and liquid carrier as described for the first aspect.

In a third aspect, the invention resides in a method of delivering a nutrient to a plant including the steps of:
(a) providing a foliar fertilizer composition comprising a nanoparticulate fertilizing compound dispersed in a liquid carrier; and
(b) applying the foliar fertilizer composition to the plant, wherein, the nanoparticles have a contact surface area to total surface area ratio greater than 1:4.

Preferably, the contact surface area to total surface area ratio is approaching 1:2.

Preferably, the nanoparticulate fertilizing compound is a nanocrystalline fertilizing compound.

Suitably, the nanoparticles have a planar or sheet-like morphology.

Preferably, the nanoparticulate fertilizing compound has an overall positive surface charge or potential in water.

The method of the third aspect may be performed using the fertilizing compound and liquid carrier as described for the first and/or second aspect.

In a fourth aspect, the invention resides in a method of delivering a nutrient to a plant including the steps of:
(a) providing a foliar fertilizer composition comprising a fertilizing compound dispersed in a liquid carrier; and
(b) applying the foliar fertilizer composition to the plant, wherein the fertilizing compound has an overall positive surface charge or potential in water.

The method of the fourth aspect may be performed using the fertilizing compound and liquid carrier as described for the first and/or second aspect.

In a fifth aspect, the invention resides in a method of formulating a foliar fertilizer composition including the steps of:
(a) providing a nanocrystalline fertilizing compound having a contact surface area to total surface area ratio greater than 1:4; and
(b) dispersing the fertilizing compound in a liquid carrier.

The method of the fifth aspect may be performed using the fertilizing compound and liquid carrier as described for the first and/or second aspect.

Further features of the present invention will become apparent from the following detailed description.

Throughout this specification, unless the context requires otherwise, the words "comprise," "comprises" and "comprising" will be understood to imply the inclusion of a stated integer or group of integers but not the exclusion of any other integer or group of integers.

BRIEF DESCRIPTION OF THE FIGURES

In order that the invention may be readily understood and put into practical effect, preferred embodiments will now be described by way of example with reference to the accompanying figures, wherein.

DETAILED DESCRIPTION

Figure 1A:
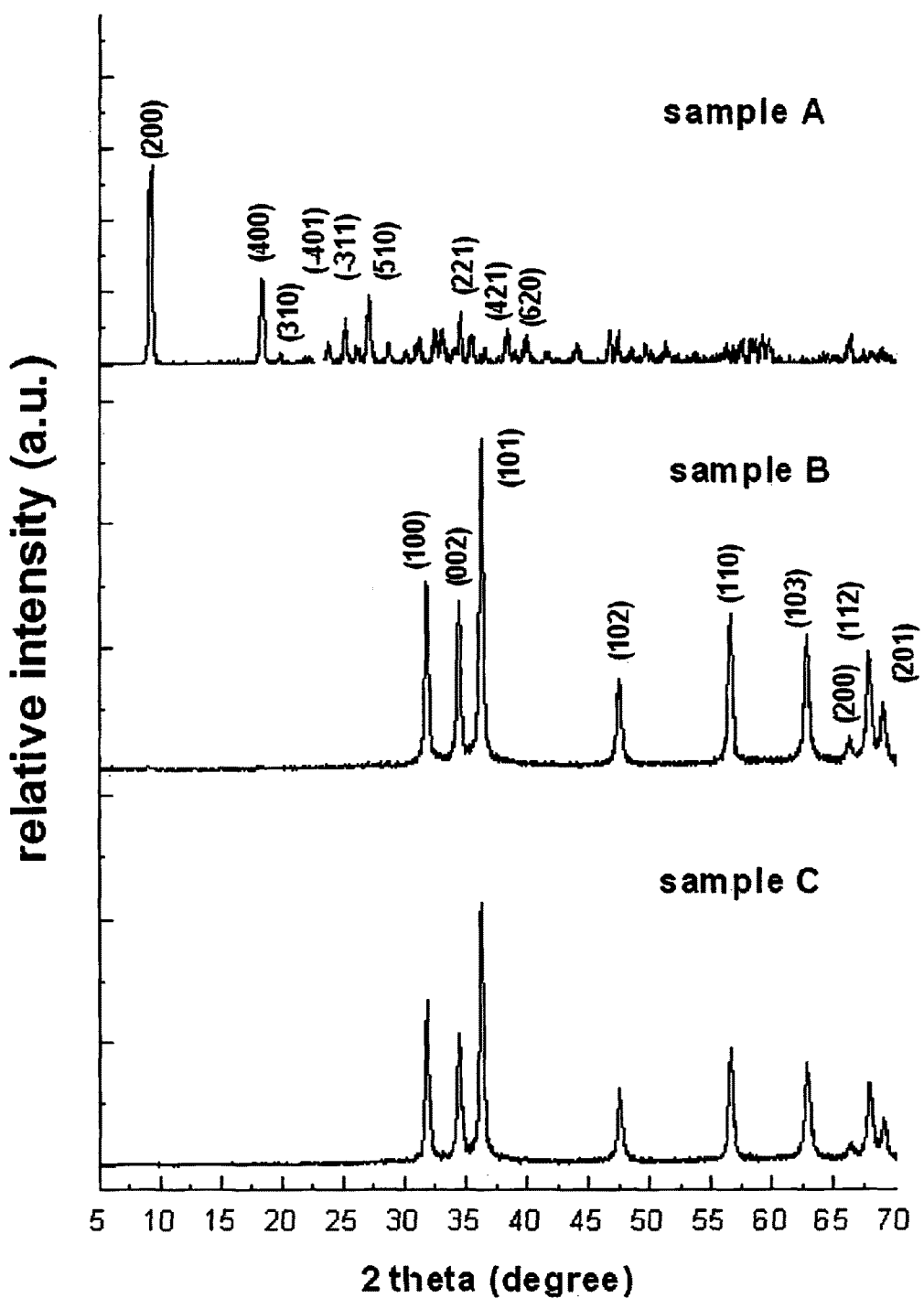
FIG. 1A shows a series of XRD patterns for three zinc-containing fertilizing compounds.

The present inventors have provided fertilizing nanocrystals demonstrating reliable and controlled dissolution of nutrients into the water film on a leaf surface. Nanocrystalline compounds containing essential nutrients have been synthesized to have effective physical and chemical characteristics, including a high contact surface area/total surface area ratio for maximal surface contact, suitable chemical composition and charge balance to achieve a net positive charge, and reactive surface edges for cation exchange to release nutrient cationic ions in the water film on leaf surfaces. The nanocrystals are the source of nutrients and slowly dissolve to release nutrient cations to maintain a concentration of between about 1-100 mg/L nutrient ion in the water film on leaf surfaces for penetration into leaf cells.

The present invention is predicated, at least in part, on the development of a foliar fertilizing compound that takes the form of nanocrystal platelets or sheets and has an overall positive surface charge or potential in water. The morphology of the nanocrystal platelets, combined with the overall positive surface charge or potential, has been observed to provide surprisingly large gains in terms of the efficiency of delivery of a nutrient element to a plant through its leaf surface. Although not wishing to be bound by any particular theory, it is postulated that the platelet shape and nanosized dimensions of the nanocrystal provide for a high overall surface area to volume ratio, meaning the compound is somewhat better when placed to dissolve and become bioavailable to the plant and, particularly, a high contact surface area to total surface area ratio leads to reduced mobility of the compound on the leaf and a much improved solubility/release profile, while the overall positive surface charge or potential results in good dispersion over, and strong adherence onto, the leaf surface, thereby reducing post-application loss. The fertilizing compound, due to its chemical composition, has a suitable solubility range in water such that it can be delivered to the plant leaves in sufficient quantities to form a slow release system without demonstrating phytotoxicity.

Although the invention will be demonstrated herein with particular reference to a zinc hydroxide nitrate fertilizing compound, it is believed that the principles discussed are equally applicable to a range of nutritional element-containing compounds capable of providing suitable nanoparticulate morphology and an overall positive surface charge or potential.

The term "foliar fertilizer," as used herein, refers to a composition suitable for application onto the leaves of a plant, which, upon dissolution, is capable of delivering a desired nutrient to the plant. The foliar fertilizers described comprise a partially soluble fertilizing compound suspended or otherwise dispersed or contained within an aqueous solution.

The term "contact surface area," as used herein, relates to the surface area of the fertilizer particle, which is in either direct contact with, or is immediately adjacent to, the leaf surface. For a variety of shapes, this is likely to be the surface with the greatest individual surface area as this will be a more stable "landing" position for the particle to take when it locates on the leaf surface. For example, for the platelets or sheet-like nanoparticles described herein, the contact surface area is one of the two large surfaces as opposed to a "side" or "edge" of the platelet or sheet.

The terms "dispersed" or "dispersion," as used herein, refers to the presence of a fertilizing compound within an aqueous solution forming a foliar fertilizer composition. The fertilizing compound will have limited solubility in the aqueous solution such that solid particles thereof will be suspended or able to be suspended therein.

Zinc is an essential micronutrient that is often applied as a component of a foliar fertilizer composition in the form of ground zinc oxide. Although generally effective, it has been found that it can be difficult to achieve an even distribution of this compound on the leaf surface and, coupled with its rather low solubility and problems with its being easily dislodged from the leaf surface by wind and rain, can mean that inadequate amounts of zinc are entering the plant.

The present inventors postulated that optimization of the morphology and charge characteristics of a zinc-containing fertilizing compound could result in improved delivery, retention on the leaf surface and availability of the zinc to a plant leaf surface.

Three samples of a zinc-containing fertilizing compound were synthesized and characterized as set out in the examples section. Sample A was shown to be zinc hydroxide nitrate ($Zn_5(OH)_8(NO3)_2$), which typically exists in the dihydrate form as $Zn_5(OH)_8(NO3)_2 \cdot 2H_2O$. Samples B and C were both zinc oxide but the different synthetic conditions employed in their production resulted in nanoparticles with different morphology characteristics.

Zinc hydroxide nitrate, Sample A, was synthesized by a variation on a known synthetic method, as described in the examples section. Samples B and C were synthesized in a relatively similar manner but with key variations as set out in the example section. The particular process conditions used produced zinc-containing fertilizing compounds with corresponding morphologies as discussed below.

Figure 2:
FIG. 2 shows two scanning electron micrograph images of sample A (zinc hydroxide nitrate) as a fertilizing compound of the present invention.
Figure 3:
FIG. 3 is a scanning electron micrograph image of sample B (zinc oxide)
Figure 4:
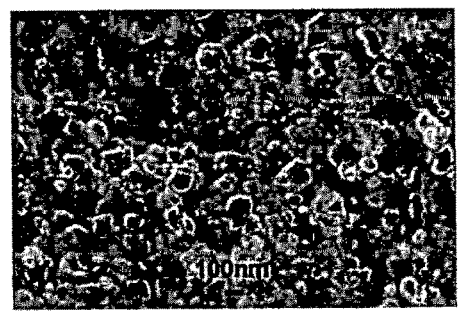
FIG. 4 is a scanning electron micrograph image of sample C (zinc oxide)
Figure 5:
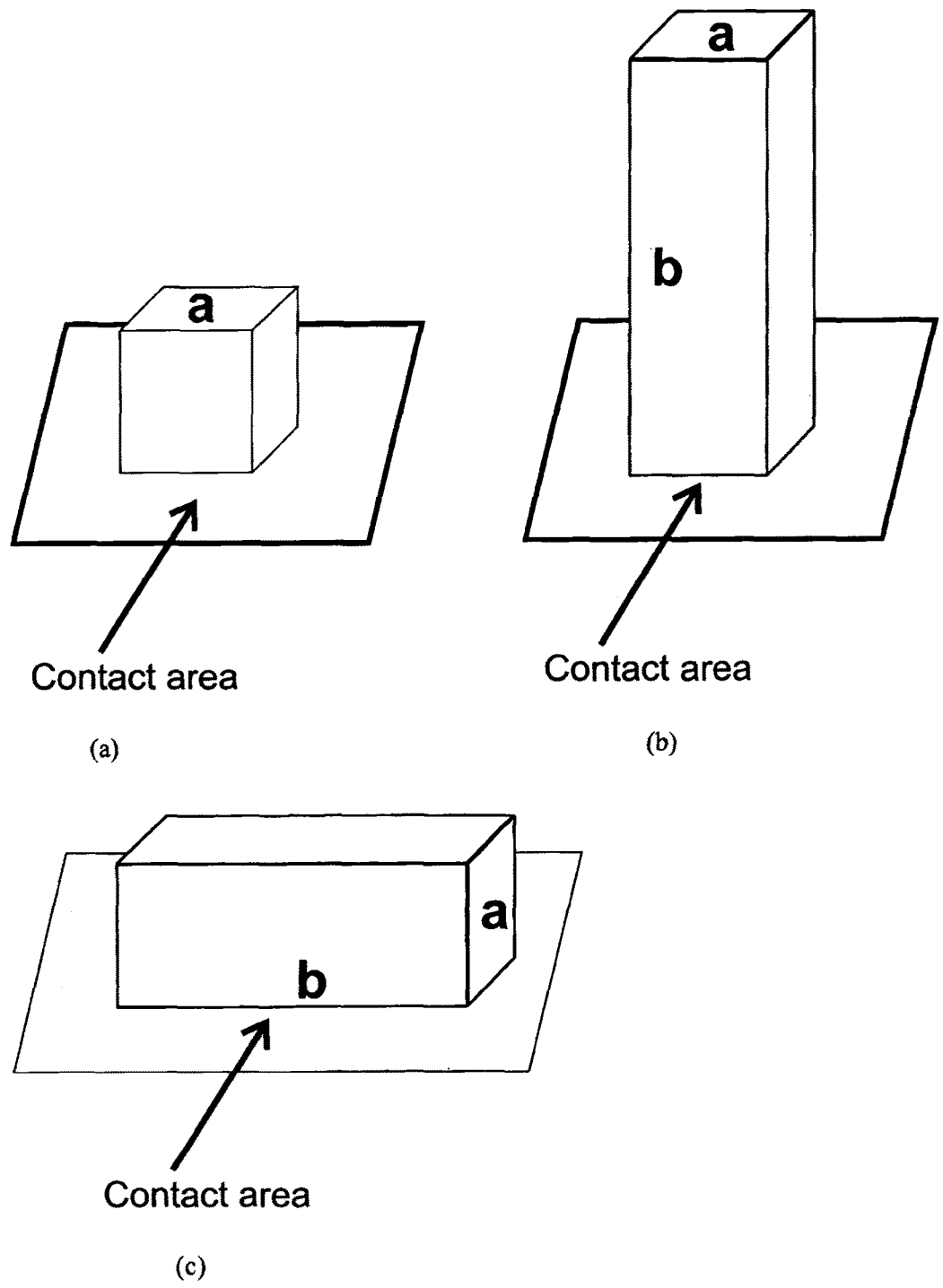
FIG. 5 is a series of diagrammatic representations of the contact area of different morphologies of fertilizing compounds.

FIG. 2 shows two scanning electron micrograph (SEM) images of sample A in which the platelet or sheet-like morphology of the material can be clearly seen. The thickness of the platelets are between about 50-100 nm, while the lateral dimension was generally in the range of 0.2-1 µm. The zinc hydroxide nitrate synthesized can thus accurately be described as having formed a nanomaterial or being nanoparticulate. Particularly, the images shown in FIG. 2 can be said to show nanocrystals.

The platelet shape of the zinc hydroxide nitrate nanocrystals means that they have a very high leaf contact surface area to total surface area ratio. This has been found to provide surprisingly large gains in efficacy over larger amorphous particles and even morphologies such as nanocubes, nanorods and the like as, first, a greater proportion of the zinc hydroxide nitrate is exposed to the environment, which will solubilize the material and allow it to enter the plant leaf and, second, more of the material is in physical contact with the leaf surface. This second point results in the zinc being made available to the plant in a more efficient manner and also means the zinc hydroxide nitrate nanoparticles are less likely to be mobile on the leaf surface and, therefore, inadvertently displaced, as can happen with shapes having a lower contact surface area to total surface area ratio and greater resulting mobility, such as spherical particles.

In general terms, the smaller the size of a crystal with a particular shape, the larger the specific surface area (or surface area to volume ratio) and, thus, the greater the likelihood of a larger relative contact area between crystal and leaf. In relation to the nanocrystals provided by the present invention, this can be further considered by the ratio of the contact surface area (i.e., the area of crystal in contact with or immediately adjacent the leaf surface) to the total surface area of the crystal. By way of example, for a sphere, the theoretical contact area approaches zero, as it is a point contact, and so the ratio is close to zero. For a cube the ratio is 1/6, for a very long square prism, the ratio is close to 1/4, and for a very thin sheet, the ratio is close to 1/2. Thus, for a nanocrystal of sheet-like or platelet morphology, as seen from sample A, more surface area is effectively available as the leaf contact area. This is shown in FIG. 5.

FIG. 3 shows that Sample B produced a typical zinc oxide crystal shape, nanorods, with a hexagonal cross-section. The side length of the hexagonal cross-section was about 100 nm, while the length of the rods was in the range of 200-400 nm.

FIG. 4 is an SEM of the particles of Sample C and it can be seen that the crystal size was approximately 50-100 nm, on average, without noticeable morphological features. These crystals are aggregated into particulates of a hundred to a few hundred nanometers in size.

The uptake of each of Samples A, B and C, along with a commercial zinc-containing foliar fertilizer (Activist 30% Zn in which the zinc is present as zinc oxide) was tested on capsicum plant leaves, as set out in the examples section. The results of these tests are summarized in Table 1, wherein the parameter LSD 0.05 refers to Fisher's least significant difference analysis with 5% limitation.

TABLE 1

Foliar zinc uptake from various samples

| Fertilizers | Applied Zn (µg) | Zn uptake (µg/leaf) | % applied dose |
|---|---|---|---|
| Sample A | 288 | 26.85 | 9.32 |
| Sample B | 300 | 16.49 | 5.50 |
| Sample C | 300 | 15.67 | 5.22 |
| Activist 30% Zn | 268 | 9.84 | 3.67 |
| $LSD_{0.05}$ | | 6.95 | 2.38 |

The results show that the zinc hydroxide nitrate (Sample A) is significantly more effective at delivering zinc into the plant leaf than either of Sample B or C or the commercially available treatment. In terms of the percentage of the applied zinc dosage to reach the interior of the leaf, Sample A was more efficacious than the commercial treatment in making bioavailable almost three times as much zinc for a similar total applied amount.

Samples B and C produced relatively similar results to each other and both were improved over the commercial treatment, although by an amount just under the determined limit of statistical significance. The better delivery of zinc into the leaf, as observed for Samples B and C by comparison to the commercial treatment, is believed to be due purely to the smaller, nanoscale size of their particles. The Activist 30% Zn contains zinc oxide, just as Samples B and C do, but the smaller particle sizes of B and C result in a higher overall bulk solubility and so more of the zinc is available to the leaf.

The success of the zinc hydroxide nitrate as a fertilizing compound can be attributed to a number of features resulting from its particle morphology and/or physicochemical characteristics. These features include, but are not limited to, the platelet/sheet-like shape of the nanocrystals providing for a high surface area to volume ratio, high contact area to total surface area ratio and low mobility on the leaf surface; the nanoscale dimensions of the platelet improving solubility of the material; the surface charge profile or zeta potential of the zinc hydroxide nitrate; and the chemical composition of the zinc hydroxide nitrate itself assisting in providing an optimal solubility profile.

In one general embodiment of the invention, the fertilizing compound is present in a foliar fertilizer composition in the form of particles having at least one dimension less than about 1000 nm, preferably less than about 500 nm, more preferably less than about 250 nm, even more preferably less than about 150 nm, most preferably less than about 100 nm. These nanoscale dimensions allow the fertilizing compound within a foliar fertilizer composition to be dispersed evenly, in appropriate amounts, across the leaf surface.

Although the platelet morphology described herein is optimal, it will be appreciated that other nanoparticulate shapes may be suitable so long as they provide a sufficiently large contact surface area to total surface area ratio, attain a reasonable rate of solubilization, and, therefore, release of the bound zinc. Preferably, the contact surface area to total surface area ratio of the nanoparticulate shapes will be greater than 1:6, more preferably greater than 1:4, even more preferably greater than 1:3, and still more preferably approaching 1:2.

As discussed, it is preferred that the fertilizing compound exists in a form that has a high contact surface area to total surface area ratio to ensure good contact over a maximal area of the leaf surface and to increase the amount of compound exposed to solubilizing conditions. As an alternative to the ratio above, this may be described as being a contact surface area to volume ratio of the fertilizing compound particles of at least 1/μm, preferably at least 10/μm, more preferably at least 20/μm, even more preferably at least 50/μm, and most preferably at least 100/μm. This ratio can be calculated as shown below for certain crystal shapes relating to those shown in FIG. 5, Panels a-c.

FIG. 5(*a*) Cube:

Contact surface area (Sc)=$a^2$

Volume (V)=$a^3$ therefore, Contact surface area to volume ratio: R (Sc/V)=1/a

If a=0.01 μm (10 nm), then R (Sc/V)=100/μm

If a=0.1 μm (100 nm), then R (Sc/V)=10/μm

If a=1 μm (1000 nm), then R (ScN)=1/μm

If a=10 μm, then R (Sc/V)=0.1/μm

FIG. 5(*b*) Square prism (standing):

Contact surface area (Sc)=$a^2$

Volume (V)=$a^2b$ therefore, Contact surface area to volume ratio: R (Sc/V)=1/b, depending on b (height or thickness)

Suppose a=1 μm (1000 nm),

If b=0.01 μm (10 nm), then R (Sc/V)=100/μm (sheet)

If b=0.1 μm (100 nm), then R (Sc/V)=10/μm (plate)

If b=1 μm (1000 nm), then R (Sc/V)=1/μm

If b=10 μm, then R (Sc/V)=0.1/μm (rod)

Note that a cylinder would give approximately the same result.

FIG. 5(*c*) Square prism (laying down):

Contact surface area (Sc)=ab

Volume (V)=$a^2b$ therefore, Contact surface area to volume ratio: R (Sc/V)=1/a (depending on a scale)

Suppose b=1 μm (1000 nm),

If a=0.01 μm (10 nm), then R (Sc/V)=100/μm (rod)

If a=0.1 μm (100 nm), then R (Sc/V)=10/μm (rod)

If a=1 μm (1000 nm), then R (Sc V)=1/μm

If a=10 μm, then R (Sc V)=0.1/μpm (plate standing)

The contact area to volume and/or total surface area ratio of a nanoparticle with platelet or sheet-like morphology is thus much higher than other common morphologies, providing distinct advantages when used as foliar fertilizers that have not previously been considered.

The surface charge of a leaf is predominantly negative and this is a factor that is also not considered or addressed by prior art foliar suspension fertilizers. Most fertilizers employ metal oxides having a negative charge, at neutral pH, which does not provide for optimal dispersion onto and contact with the leaf surface. Zinc oxide nanoparticulate fertilizing compounds display a negative surface charge in water at neutral pH. They also use surfactants within the composition that can interfere with the surface charge matching between fertilizing compound and leaf surface. Preferably, nonionic or cationic surfactants are employed in the present formulations to maintain or enhance the positive charge of the suspension for improved adhesion with negatively charged leaf surfaces.

The zinc hydroxide nitrate, synthesized as Sample A, has a positive surface charge or potential in water that can provide distinct advantages in terms of improving the dispersion of the compound evenly over the leaf surface as well as the contact between compound and leaf. The overall positive surface charge or potential means the nanocrystalline platelets of zinc hydroxide nitrate are attracted to the leaf surface and held in place so that they are less likely to be washed off or otherwise displaced after application. The positive surface charge is the charge presented on the platelet flat outer face and, while the edges of the platelets may display some negative charge, due to the size of this face, the overall surface charge is overwhelmingly positive.

The solubility of the fertilizing compound in water is also a component of the present invention. As already discussed, this is influenced to some extent by the nanoscale size of the particles, as well as the high surface area (and contact area) to volume/total surface area ratios achieved. However, the chemical composition of the fertilizing compound is also key. Preferably, the fertilizing compound has one or more nitrate, chloride, sulphate, phosphate, acetate or like water-soluble salt-forming groups that aid in improving the solubility of the compound in comparison to a compound such as zinc oxide or zinc hydroxide.

Preferably, the solubility of the fertilizing compound in water is between 0.1-100 mg/L for micronutrient elements and 100-1000 mg/L for macronutrient elements. For zinc and manganese a suitable range is 5-50 mg/L; for copper 1-5 mg/L, for molybdenum 0.1-1 mg/L and for calcium and magnesium 100-500 mg/L.

The fertilizing compound will be delivered to the plant in the form of a foliar fertilizer comprising the fertilizing compound dispersed in a liquid carrier. Preferably, the liquid carrier is an aqueous carrier. The liquid carrier may be water based, but contain one or more suitable surfactants or additives for stability or like formulation purposes. A suitable stability additive is carboxymethyl cellulose (CMC) to form a particularly preferred foliar fertilizer composition.

Although the discussion herein has focused on the synthesis of zinc-containing fertilizing compounds, it will be appreciated that the principles of forming a nanoscale compound with high contact surface area to total surface area ratio, suitable solubility and overall positive surface charge or potential can be applied to nano- or submicron particles of a range of other essential elements. In one embodiment, the fertilizing compound may contain a plant nutrient element selected from the group consisting of zinc, copper, iron, manganese, boron, molybdenum, chlorine, phosphorus, potassium, calcium, magnesium and sulphur.

EXAMPLES

Sample Preparation

Three zinc-containing samples were prepared as herein described. Sample A was synthesized by following a modified precipitation method. A 3.75 M solution of $Zn(NO_3)_2$ (75 mmol in 20 ml deionized water) was poured with 0.75 M NaOH (37.5 mmol in 50 mL deionized water), i.e., giving a OH/Zn ratio of 0.5, with mechanical stirring at a rate of 500 rpm at room temperature. The stirring was continued for a period from 10 minutes to 24 hours. The precipitate was then collected by filtration, washed with deionized water and dried at 65° C.

Sample B was synthesized using a similar process as for Sample A but the OH/Zn ratio was changed to 1.6 (8/5). In brief, a 1.88 M solution of $Zn(NO_3)_2$ (18.8 mmol in 10 ml deionized water) was poured with 0.75 M NaOH (30.0 mmol in 40 mL deionized water), i.e., giving a OH/Zn ratio of 1.6, under mechanical stirring at a rate of 500 rpm at 50° C. The stirring was continued for a period of 1 to 24 hours. The precipitate was then collected by filtration, washed with deionized water and dried at 65° C.

Sample C was synthesized via the same process as that of sample B but with the concentration of zinc nitrate reduced. A 0.47 M solution of $Zn(NO_3)_2$ (23.5 mmol in 50 ml deionized water) was poured with 0.75 M NaOH (37.5 mmol in 50 ml deionized water), i.e., giving a OH/Zn ratio of 1.6, under mechanical stirring at a rate of 500 rpm at 50° C. The stirring was continued for a period from 1 to 24 hours. The precipitate was then collected by filtration, washed with deionized water and dried at 65° C.

Sample Characterization

Powder X-ray diffraction (XRD) was performed using a Bruker D8 Advance equipped with a Copper target scintillation detector and graphite monochromator with Cu Kα ($\lambda$=1.54 Å) radiation. The 2θ angle was scanned from 5° to 70° and the scanning rate was 3°/minute. The Fourier transform infrared (FTIR) spectra were collected in the range of 4000-400 $cm^{-1}$ via a Fourier Transform Infrared-Attenuated Total Reflectance technique in a Nicolet 6700 FTIR spectrometer manufactured by Thermo Electron Corporation. SEM images were recorded in a JEOL JSM-6300 to investigate the morphology and particle sizes of the produced samples.

The powder X-ray diffraction pattern of sample A, shown in FIG. 1A, uppermost pattern, was identified by comparison with the internationally accepted database of powder diffraction patterns, JCPDS (Joint Committee on Powder Diffraction Standards now administered by the International Centre for Diffraction Data) card 24-1460 as being zinc hydroxide nitrate according to the characteristic diffraction peaks that are marked with the Miller (hkl) indices, as seen in FIG. 1. The observed interlayer spacing for sample A was around 0.97 nm, which is in good agreement with literature reports (Hussein et al., 2009).

Figure 1B:
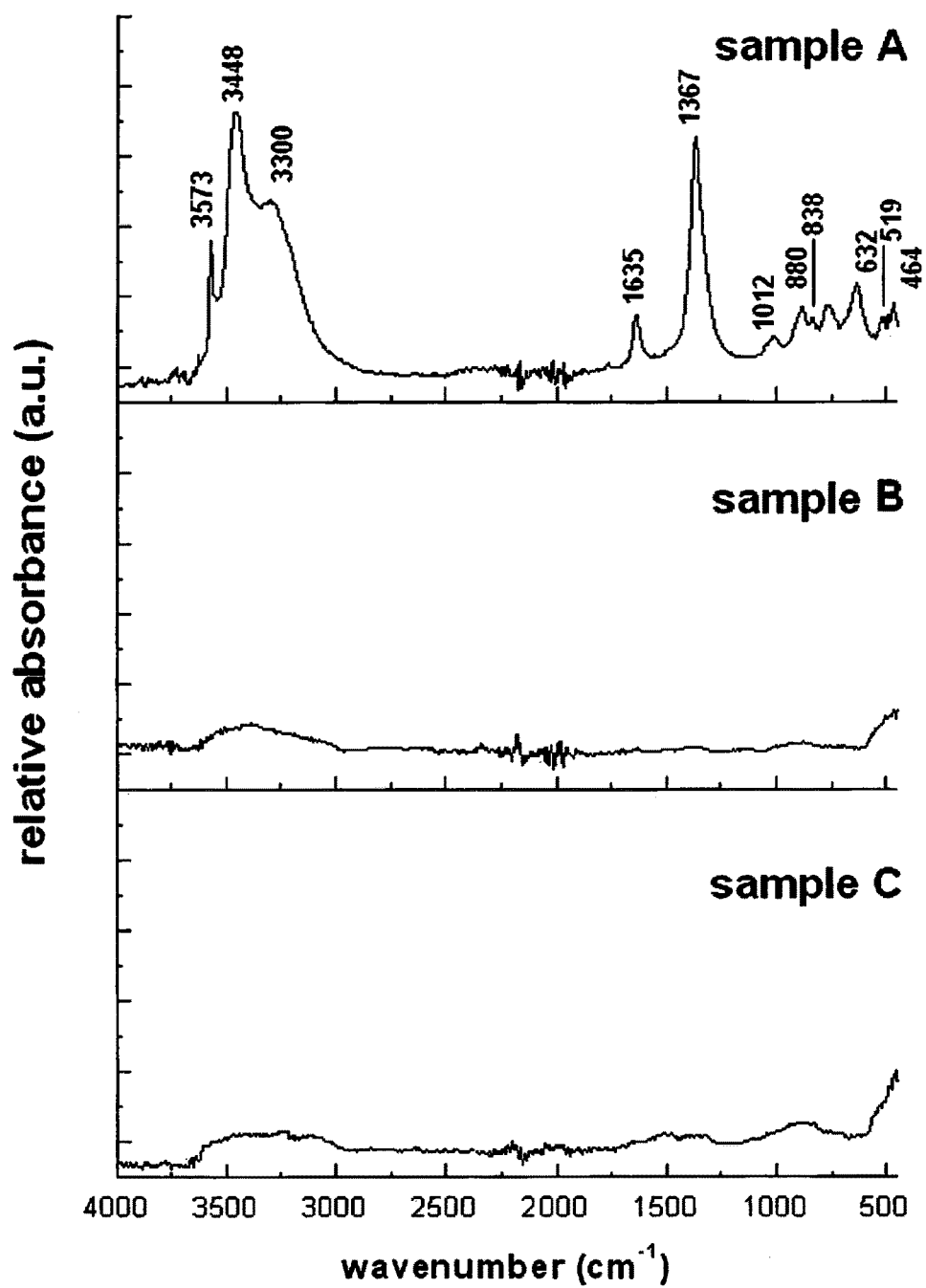
FIG. 1B shows a series of FTIR spectra for three zinc-containing fertilizing compounds.

The FTIR spectrum of sample A, as seen in FIG. 1B, uppermost spectra, further confirmed the compound as being zinc hydroxide nitrate. The sharp peak seen at 3573 $cm^{-1}$ is attributed to the stretching vibration of the O—H bond associated with the zinc ion and is to be expected as zinc hydroxide nitrate contains a relatively high number of hydroxide groups. The broad band at 3448 $cm^{-1}$, as well as the peak at 1635 $cm^{-1}$, indicated the presence of water molecules in the interlayers and/or adsorbed on the molecule's surface. The shoulder seen at about 3300 $cm^{-1}$ is attributed to O—H groups (from Zn—OH and $H_2O$) hydrogen-bonded with nitrate or water molecules. The intensive peak around 1367 $cm^{-1}$, the weak peaks around 1012 $cm^{-1}$, and the weak peak at 838 $cm^{-1}$ characterize various vibration modes of the nitrate group.

According to the literature, a shoulder around 1430 $cm^{-1}$, relating to nitrate anions grafted to the hydroxide layer, should be observable. However, in this instance, the shoulder was not significant, probably indicating the nitrate group keeps its $C_{3v}$ symmetry. The band at 632 $cm^{-1}$ and the weak peak at 519 $cm^{-1}$ were due to bending of the Zn—O—H bond and the vibration of the Zn—O bond resulted in a peak at 464 $cm^{-1}$. In this manner, the X-ray diffraction patterns and FTIR spectra allowed Sample A to be unequivocally identified as zinc hydroxide nitrate with a molecular formula of $Zn_5(OH)_8(NO_3)_2 \cdot 2H_2O$.

Samples B and C gave a powder X-ray diffraction pattern, shown in FIG. 1A, middle and bottom, respectively, identical to the JCPDS card 36-1451, indicating the presence of wurtzite-structure zinc oxide. In the FTIR spectra of samples B and C, shown in FIG. 1B, middle and bottom, respectively, weak and broad bands at around 3372 $cm^{-1}$ were observed, which could be attributed to O—H stretching of adsorbed water molecules. Vibration of the Zn—O bonds was observed at around 500 $cm^{-1}$.

Foliar Uptake of Samples A, B and C

Capsicum (*Capsicum annume* L.cv. Giant Bell) plants were grown in a glasshouse with the temperature controlled at 25/20° C. (day/night). One week after germination, each capsicum seedling was transferred into a 3-L pot filled with potting mix. Basal nutrients were supplied to each pot by adding 5 g of Osmocote slow release fertilizer (NPK 16:9:12 plus micronutrient; Scotts Professional) per pot.

Leaves from the 6-week-old plants were then cut at the base of their petioles. Petioles were immersed in Eppendorf tubes filled with a nutrient solution containing all basal nutrients except zinc. The tubes were inserted in holes at the bottom of Petri dishes. The leaf blades rested on moist filter paper to create approximately 100% relative humidity during the incubation process.

The as-prepared leaf surfaces were then exposed to one of four different zinc sources being Samples A, B and C, described above, and a sample for comparison purposes. A commercial product, Activist 30% Zn (Agrichem Co. Ltd.), was applied as the comparison sample and some leaves were not exposed to any zinc-containing sample to thereby act as a control. Samples A, B and C were dispersed in deionized water to make homogeneous suspensions with the aid of ultrasonic treatment and employing the same surfactant as is found in Activist 30% Zn to ensure consistency between samples.

The three synthesized zinc sample suspensions and the Activist 30% Zn were applied on separate adaxial leaf surfaces using a micropipette with droplet volume of approximately 5 µL. The calculated loading amount of fertilizing compound on each leaf surface is displayed in Table 1. After application of the zinc-containing samples, the leaves were transferred into an incubator and incubated for three days with the temperature set at 25/20° C. (day/night). The light intensity on each shelf was greater than 170 µmol/m²/s (TRISL model, Thermoline). The leaves were then harvested and all residual zinc compound on the leaf surface washed off by wiping the treated areas using clean moist cotton buds and then rinsing three times with triple deionized water. The leaves were then oven-dried at 68° C. for 48 hours before digestion with concentrated $HNO_3$ and $H_2O_2$ using a microwave digestor (Milestone Inc). Foliar uptake of zinc was determined by comparison of the difference between the zinc concentration found in treated leaves and untreated leaves. Table 1 shows the results of the uptake study.

The present invention provides for a foliar fertilizing compound demonstrating a number of improved properties. The morphology of the fertilizing compound particles is such that the surface area in contact with the leaf is maximized and the sheet-like nano-sized particles provide for limited mobility when applied to the leaf and allow good solubilization. The chemical composition of the compound is such that it sits within an optimal solubility range in water preventing rapid dissolution, which may result in phytotoxicity, but achieving a higher rate of dissolution than zinc oxides. This ensures an appropriate rate of controlled release of the desired element, thereby providing the plant with an immediate but long-lasting supply of nutrient with a single application. Further, consideration of the role charge can play in assisting with distribution of the fertilizing compound, as well as limiting the likelihood of its displacement from the leaf surface after application, has led to production of a fertilizing compound with an overall positive surface charge or potential in water. This interacts with the net negative charge presented by the leaf surface to give the advantages discussed.

Throughout the specification, the aim has been to describe preferred embodiments of the invention without limiting the invention to any one embodiment or specific collection of features. It will be appreciated by those of skill in the art that, in light of the present disclosure, various modifications and changes may be made in the particular embodiments exemplified without departing from the scope of the invention.

The invention claimed is:

1. A foliar fertilizer composition comprising water-soluble fertilizing nanoparticles having a ratio of contact surface area to total surface area of greater than 1:4, a platelet morphology, and an overall positive surface charge in water at neutral pH, wherein the fertilizing nanoparticles consist essentially of:
   a cationic nutrient element selected from the group consisting of zinc, copper, iron, manganese, boron, molybdenum, potassium, and magnesium; and
   one or more groups capable of forming a water-soluble salt with the cationic nutrient element.

2. The foliar fertilizer composition of claim 1, wherein the ratio of the contact surface area to the total surface area of the water-soluble fertilizing nanoparticles is greater than 1:3.

3. The foliar fertilizer composition of claim 1, wherein the ratio of the contact surface area to the total surface area ratio of the water-soluble fertilizing nanoparticles is between 1:3 to 1:2.

4. The foliar fertilizer composition of claim 1, wherein the water-soluble fertilizing nanoparticles have a thickness less than about 500 nm.

5. The foliar fertilizer composition of claim 1, wherein the water-soluble fertilizing nanoparticles have a thickness less than about 250 nm.

6. The foliar fertilizer composition of claim 1, wherein the water-soluble fertilizing nanoparticles have a thickness less than about 150 nm.

7. The foliar fertilizer composition of claim 1, wherein the water-soluble fertilizing nanoparticles have a thickness less than about 100 nm.

8. The foliar fertilizer composition of claim 1, wherein the ratio of the contact surface area to the total surface area of the water-soluble fertilizing nanoparticles is within a range of from 1:4 to 1:2.

9. The foliar fertilizer composition of claim 1, wherein a ratio of the contact surface area of the fertilizing nanoparticles to a volume of the water-soluble fertilizing nanoparticles is at least 10.

10. The foliar fertilizer composition of claim 1, wherein a ratio of the contact surface area of the fertilizing nanoparticles to a volume of the water-soluble fertilizing nanoparticles is at least 50.

11. The foliar fertilizer composition of claim 1, wherein a ratio of the contact surface area of the of the fertilizing nanoparticles to a volume of the water-soluble fertilizing nanoparticles is at least 100.

12. The foliar fertilizer composition of claim 1, wherein the one or more groups capable of forming a water-soluble salt with a cationic nutrient element are selected from the group consisting of nitrate, chloride, sulphate, phosphate and acetate.

13. The foliar fertilizer composition of claim 12, wherein the cationic nutrient element is zinc, and wherein the one or more groups comprise at least one nitrate group.

14. The foliar fertilizer composition of claim 13, wherein the water-soluble fertilizing nanoparticles comprise a zinc hydroxide nitrate.

15. The foliar fertilizer composition of claim 14, wherein the water-soluble fertilizing nanoparticles comprise $Zn_5(OH)_8(NO3)_2 \cdot 2H_2O$.

16. The foliar fertilizer composition of claim 15, further comprising an aqueous liquid carrier.

17. The foliar fertilizer composition of claim 16, wherein the solubility of the water-soluble fertilizing nanoparticles in the aqueous liquid carrier is between 0.1-100 mg/L for micronutrient elements and 100-1000 mg/L for macronutrient elements.

18. The foliar fertilizer composition of claim 16, wherein the water-soluble fertilizing nanoparticles are dispersed in the aqueous liquid carrier.

19. A method of delivering a nutrient to a plant, comprising:
 providing a water-soluble foliar fertilizer composition comprising a fertilizing nanoparticles dispersed in a liquid carrier, the fertilizing nanoparticles having a ratio of contact surface area to total surface area of greater than 1:4, a platelet morphology, and an overall positive surface charge in water at neutral pH, wherein the fertilizing nanoparticles consist essentially of:
  a cationic nutrient element selected from the group consisting of zinc, copper, iron, manganese, boron, molybdenum, potassium, and magnesium; and
  one or more groups capable of forming a water-soluble salt with the cationic nutrient element; and
 applying the foliar fertilizer composition to the plant.

20. The method of claim 19, wherein the water-soluble fertilizing nanoparticles are fertilizing nanocrystals.

21. A method of formulating a foliar fertilizer composition, comprising:
 providing water-soluble fertilizing nanoparticles having a ratio of contact surface area to total surface area of greater than 1:4, a platelet morphology, and an overall positive surface charge in water at neutral pH, wherein the fertilizing nanoparticles consist essentially of:
  a cationic nutrient element selected from the group consisting of zinc, copper, iron, manganese, boron, molybdenum, potassium, and magnesium; and
  one or more groups capable of forming a water-soluble salt with the cationic nutrient element; and
 dispersing the fertilizing nanoparticles in a liquid carrier.

22. The foliar fertilization composition of claim 1, wherein the water-soluble fertilizing nanocrystals have a thickness of about 50 nm to about 100 nm and a lateral dimension of about 0.2 µm to about 1 µm.

\* \* \* \* \*